United States Patent
Min

(10) Patent No.: US 9,652,148 B2
(45) Date of Patent: May 16, 2017

(54) SOFT KEYBOARD WITH KEYPRESS MARKERS

(71) Applicant: Hongjun Min, Shanghai (CN)

(72) Inventor: Hongjun Min, Shanghai (CN)

(73) Assignee: SAP SE, Walldorf (DE)

( * ) Notice: Subject to any disclaimer, the term of this patent is extended or adjusted under 35 U.S.C. 154(b) by 490 days.

(21) Appl. No.: 14/148,639

(22) Filed: Jan. 6, 2014

(65) Prior Publication Data

US 2015/0193142 A1 Jul. 9, 2015

(51) Int. Cl.
| G06F 3/048 | (2013.01) |
| G06F 3/0488 | (2013.01) |
| G06F 3/01 | (2006.01) |
| G06F 3/0484 | (2013.01) |

(52) U.S. Cl.
CPC .......... *G06F 3/04886* (2013.01); *G06F 3/016* (2013.01); *G06F 3/04842* (2013.01)

(58) Field of Classification Search
CPC ... G06F 3/04886; G06F 3/016; G06F 3/04842
USPC ....................................................... 715/738
See application file for complete search history.

(56) References Cited

U.S. PATENT DOCUMENTS

| 8,769,427 B2* | 7/2014 | Raman | G06F 3/04883 345/177 |
| 9,395,916 B2* | 7/2016 | Bao | G06F 3/04886 |
| 2006/0020904 A1* | 1/2006 | Aaltonen | G06F 3/048 715/850 |
| 2011/0201387 A1* | 8/2011 | Paek | G06F 3/0237 455/566 |
| 2012/0324391 A1* | 12/2012 | Tocci | G06F 3/0237 715/773 |
| 2015/0067572 A1* | 3/2015 | Bai | G06F 3/04886 715/773 |
| 2015/0067596 A1* | 3/2015 | Brown | G06F 3/0416 715/808 |
| 2015/0138155 A1* | 5/2015 | Bernstein | G06F 3/0412 345/174 |
| 2015/0149899 A1* | 5/2015 | Bernstein | G06F 3/016 715/702 |
| 2015/0149964 A1* | 5/2015 | Bernstein | G06F 3/04815 715/836 |

FOREIGN PATENT DOCUMENTS

WO WO 2010039350 A2 * 4/2010 ......... G06F 3/04883

* cited by examiner

*Primary Examiner* — David Phantana Angkool

(74) *Attorney, Agent, or Firm* — Horizon IP Pte. Ltd.

(57) ABSTRACT

Disclosed herein are technologies that improve user interaction when using a soft keyboard of a touchscreen device (e.g., a smartphone or tablet computer). More particularly, the technologies described herein provide feedback to a user regarding keypress accuracy on a soft keyboard of a touchscreen device. In accordance with one aspect of the technologies, a keypress marker is presented to indicate the location of touch on the soft keyboard.

20 Claims, 8 Drawing Sheets

SOFT KEYBOARD WITH KEYPRESS MARKERS

TECHNICAL FIELD

The present disclosure relates generally to a user interface technology.

BACKGROUND

A soft keyboard is a system that replaces a mechanical or hardware keyboard on a computing device with an on-screen image map of a keyboard. A soft keyboard may also be called an onscreen keyboard, touchscreen keyboard, virtual keyboard, or software keyboard. Soft keyboards are typically used to enable input on a handheld device (such as a smartphone) so that the device does not need to have a mechanical keyboard.

BRIEF SUMMARY

Disclosed herein are technologies that improve user interaction when using a soft keyboard of a touchscreen device (e.g., a smartphone or tablet computer). More particularly, the technologies described herein provide feedback to a user regarding keypress accuracy on a soft keyboard of a touchscreen device.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Disclosed herein are technologies that improve user interaction when using a soft keyboard of a touchscreen device (e.g., a smartphone or tablet computer). More particularly, the technologies described herein provide feedback to a user regarding keypress accuracy on a soft keyboard of a touchscreen device.

Figure 1:
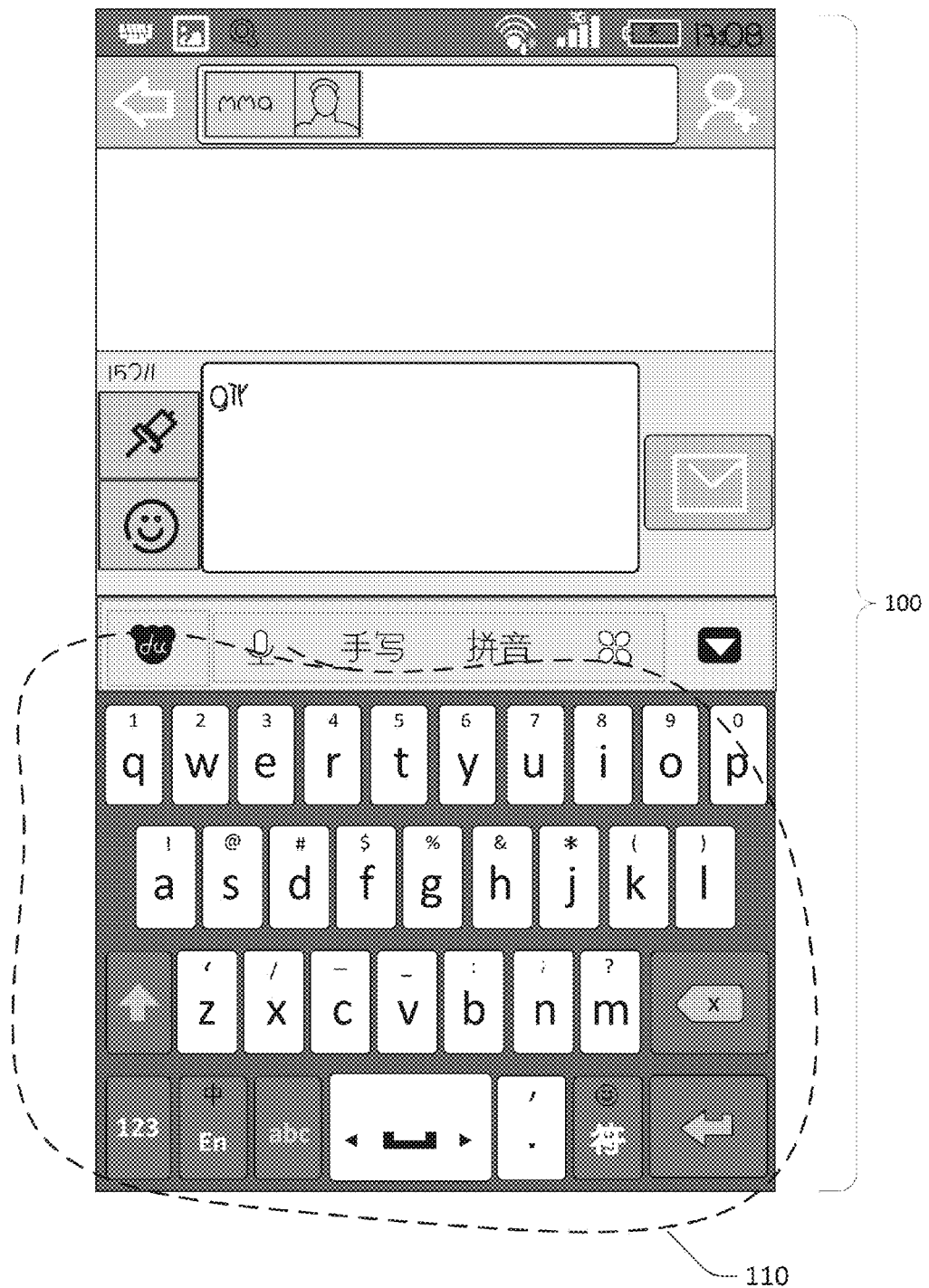
FIG. 1 illustrates an exemplary touchscreen with a soft keyboard in accordance with the technology described herein.

FIG. 1 shows an example touchscreen 100 of a device (not shown). Displayed on the example touchscreen 100 is user interface (UI) called a soft keyboard 110. Several keys, such as keys X, J, and T are part of the soft keyboard 110.

With a soft keyboard, a user enters data by tapping a keyboard portion of the touchscreen of a device. The user taps a portion of the screen real estate that corresponds to where a graphic of a key is displayed. This may be done with a stylus, but more commonly, a user uses his or her fingers to tap the screen.

Figure 2:
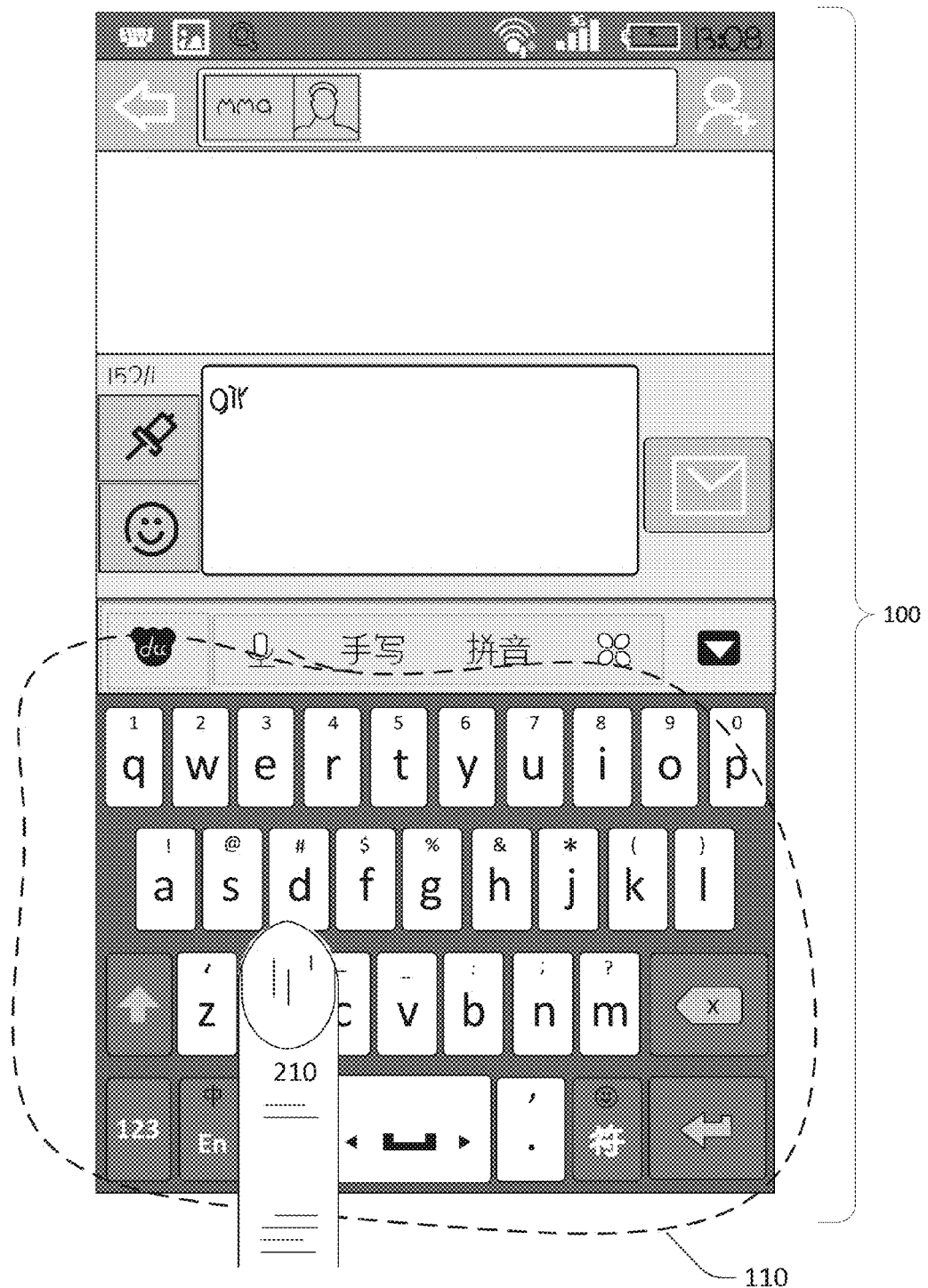
FIGS. 2-5 show user interaction with the soft keyboard in accordance with one or more implementations in accordance with the technology described herein.

FIG. 2 shows a user's finger 210 interacting with the soft keyboard 110 of the example touchscreen 100. As depicted, the user is touching the key X. However, the user's finger 210 (and even just the tip) typically covers all or most of a key. Consequently, as shown, the key X is not visible in FIG. 2 to illustrate the user's inability to see how close to the center of the key X that the user is touching.

With a mechanical key, a user receives tactile feedback of an accurate keypress. An accurate keypress is rewarded with a satisfying feeling of a keypress depression and snapback. The tactile feedback for an inaccurate keypress may result in a less than fully satisfying keypress depression and snapback and/or the feeling of insufficiently pressing multiple keys.

No such tactile feedback exists in conventional soft keyboards. Some soft keyboard approaches use audible or haptic feedback. However, this feedback confirms that some keys have been selected, but fails to give feedback on the accuracy of keypresses.

Accuracy depends upon hitting the right key. Often, the aim of the user's finger is imprecise while typing. Consequently, with conventional approaches, the user may inadvertently touch the area of key neighboring the one that he or she intended. Thus, the user selected a different key than intended. For example, the user may have meant to press the F key, but inaccurately pressed the G or D key. With conventional approaches, the only way that the user knows that his or her attempt was inaccurate is by seeing which key appears on the screen. However, that information alone does not explain why and how his or her keypress attempt went awry.

When the finger touches a key (e.g., X key) of the soft keyboard 110 of the touchscreen 100 (as shown in FIG. 2), the computing device senses and determines the center point of the touch of the fingertip of the user. That is, the location on the touchscreen that is the center of the area contacted by the user's finger is specified. This location may be specified by means of an X, Y coordinate system (e.g., Cartesian) corresponding to the real estate of the touchscreen surface area.

Figure 3:
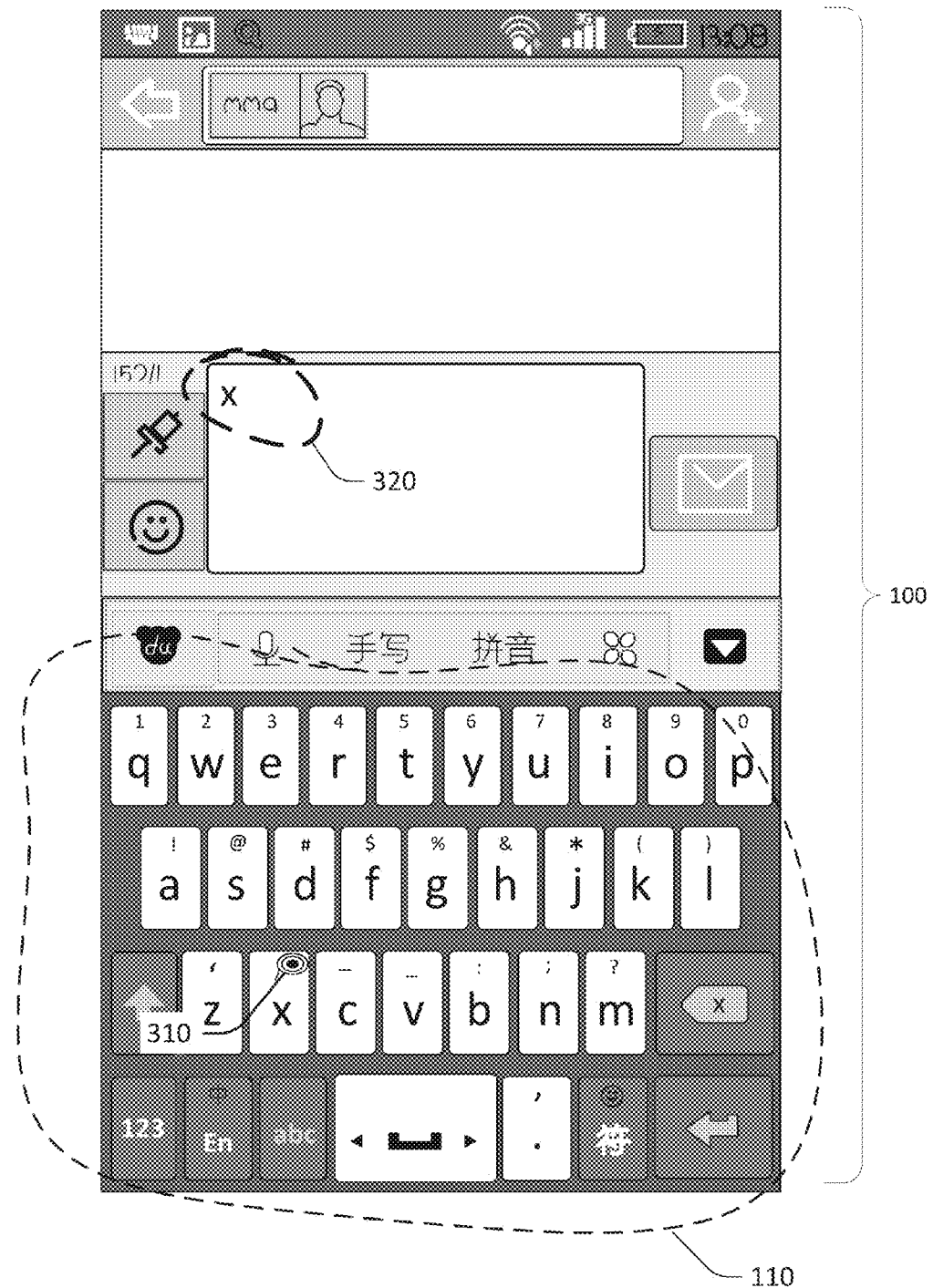

FIG. 3 shows the soft keyboard 110 of the example touchscreen 100 after the keypress depicted in FIG. 2 and described above. The letter "x" appears in the text entry area 320 of the UI. Upon determining the screen location of the keypress touch, the device generates a "keypress marker" 310 or symbol centered about that determined screen location of the keypress touch. This keypress marker 310 may be emphasized by color (e.g., red) or dynamics (e.g., blinking) to increase its visibility to the user.

Once the finger is removed, the user can see the keypress marker 310 superimposed over the soft keyboard 110. In this way, the user can gauge his or her keypress accuracy.

Figure 4:
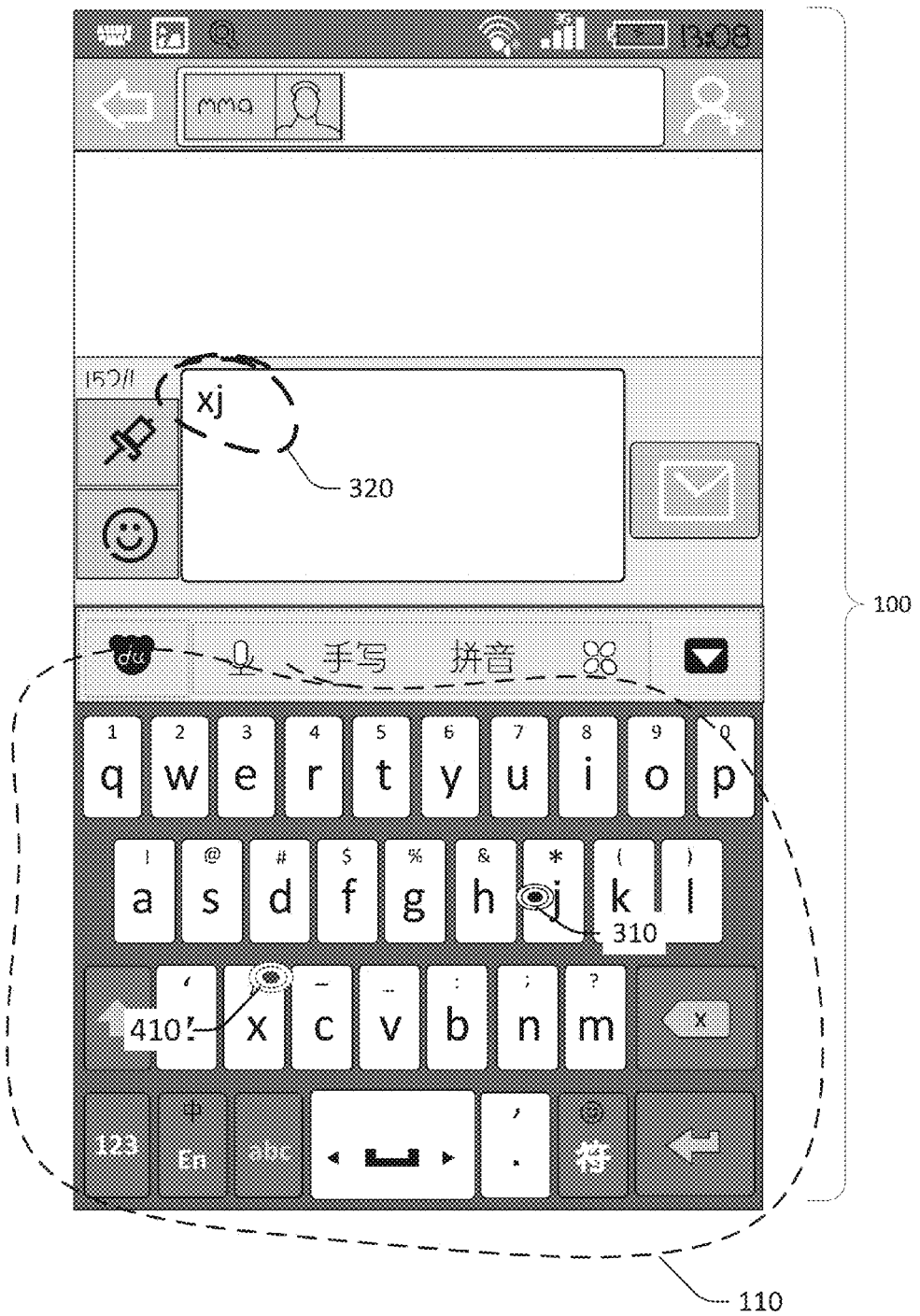

FIG. 4 shows the soft keyboard 110 of the example touchscreen 100 after another keypress (not shown). In this example, the user pressed the J key. The letters "x" and "j" appears in the text entry area 320 of the UI. Upon determining the screen location of the J-key keypress touch, a keypress-accuracy indicator updates the keypress marker 310 or symbol centered about that determined screen location of the J-key keypress touch.

Once there is a new keypress, then the marker over the previously pressed key (which was keypress marker 310 over the X key as shown in FIG. 3) changes to a previous keypress marker 410. As depicted in FIG. 4, the previous keypress marker 410 differs from the symbol used for the keypress marker 310 (e.g., just-pressed keypress marker). That difference may be expressed by using a different shaped symbol, a different colored symbol, a greyed-out symbol, or some combination thereof. Furthermore, the previous keypress marker 410 may appear to dissolve as additional keys are pressed. Alternatively, the previous keypress marker 410 may progressively enlarge as additional keys are pressed.

Figure 5:
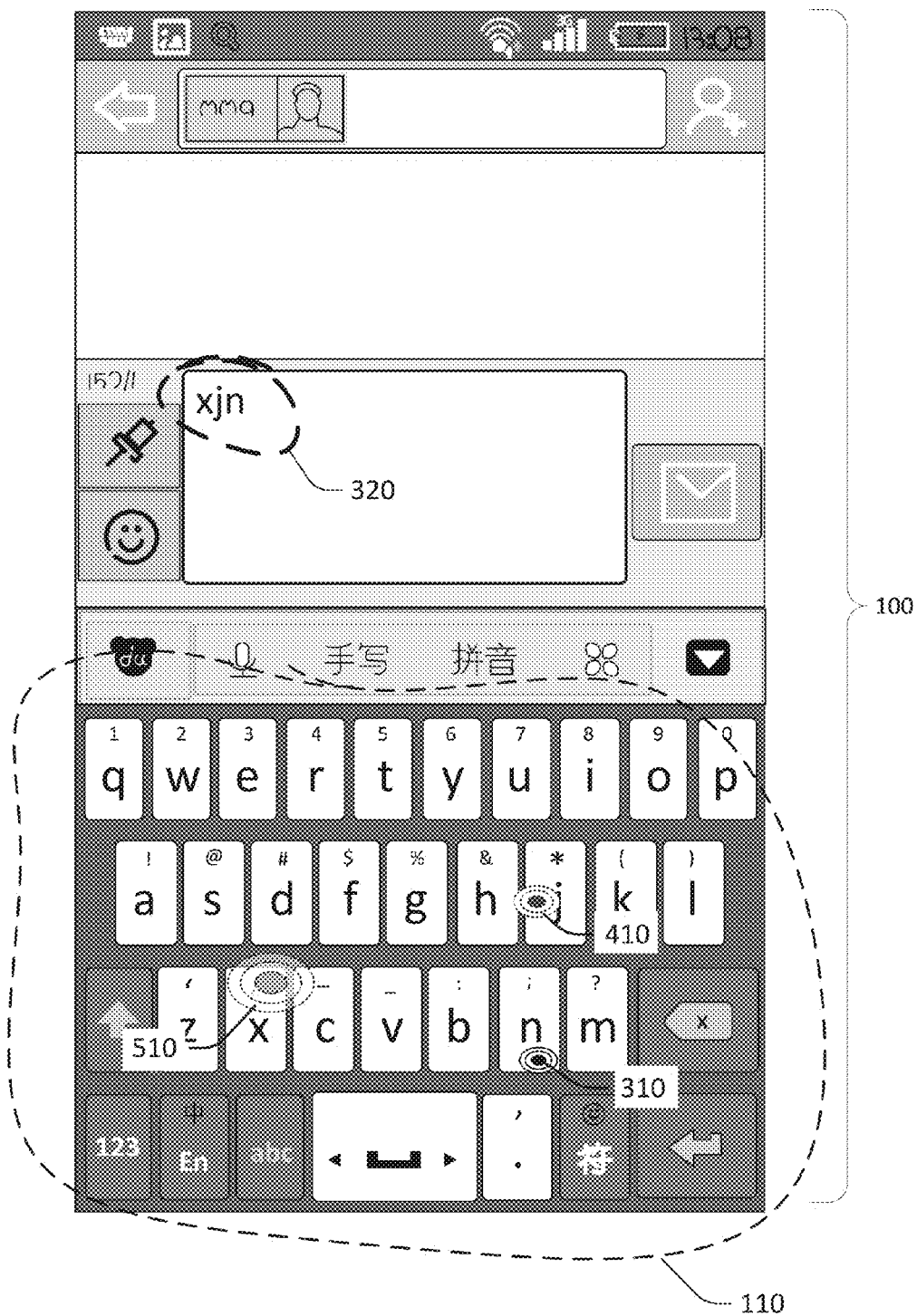

FIG. 5 shows the soft keyboard 110 of the example touchscreen 100 after still another keypress (not shown). In this example, the user pressed the N key. The letters "x," "j," and "n" appear in the text entry area 320 of the UI. Upon determining the screen location of the N-key keypress touch, the keypress-accuracy indicator updates the keypress marker 310 or symbol centered about that determined screen location of the N-key keypress touch.

Once there is a new keypress, then the markers over the previously pressed keys (e.g., marker over the X key as shown in FIGS. 3 and 4 and the marker over the J key as shown in FIG. 4) changes to indicate previously pressed keypress markers 410 and 510, respectively. As depicted in FIG. 5, the just-previously pressed keypress marker 410 differs from the symbol used for the keypress marker 310, and the marker 510 that was pressed previously to the just-previously pressed keypress marker 410 is different still from the other displayed markers.

The difference between the various markers alters as each subsequent key is pressed. That difference may be expressed by using a sequence of different shaped symbols, a series of different but ordered colored symbols, a progressively greyed-out symbols, or some combination thereof. Furthermore, the differences may be demonstrated by an apparent dissolve of the symbols as additional keys are pressed. Alternatively, the differences in symbols may be demonstrated by the symbols progressively enlarging or shrinking as additional keys are pressed.

Figure 6:
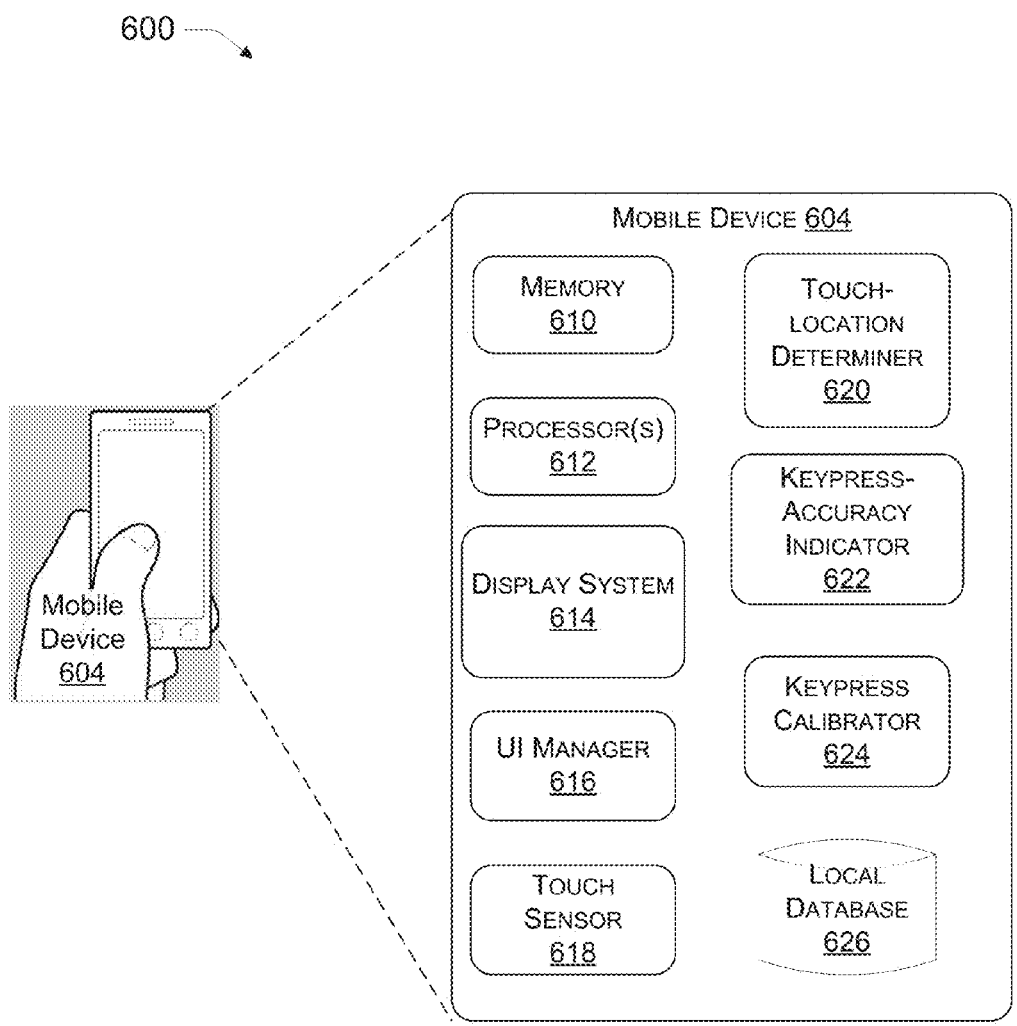
FIG. 6 illustrates an example system for implementing the technology described herein.

FIG. 6 illustrates example system 600 for implementing the technology described herein. The system 600 includes a mobile device 604.

The mobile device 604 includes a memory 610, one or more processor(s) 612, a display system 614, a UI manager 616, a touch sensor 618, a touch-location determiner 620, a keypress-accuracy indicator 622, a keypress calibrator 624, and local database 626. These functional components can be separate or some combination of hardware units. Alternatively, the components can be implemented, at least in part, in software and thus be stored in the memory 610 and executed by the processors 612.

The display system 614 includes the display itself (such as the touchscreen 100) and the graphics system to drive that display. The UI manager 616 manages the UI of the mobile device. The UI manager 616 generates the graphics for the soft keyboard (such as soft keyboard 110).

The touch sensor 618 detects a touch on the touchscreen (such as touchscreen 100). Typically, capacitive sensing is used. The touch sensor may determine which key is pressed based upon the portion of the screen real estate used by a given key.

The touch-location determiner 620 determines where exactly (using, for example, Cartesian coordinates) the user's finger touched the touchscreen. More particularly, the touch-location determiner 620 determines the approximate center point of the area touched by the user's finger.

The keypress-accuracy indicator 622 superimposes a keypress marker (e.g., marker 310) over the soft keyboard and it centers that marker over the center point determined by the touch-location determiner 620. The keypress-accuracy indicator 622 also updates the displayed marker once subsequent keys are pressed. The updates change the appearance of the displayed marker to indicate that it marks a previously pressed key and not the currently pressed key. Of course, the marker (current and previous) can be collected on and about the same key if the user presses the same key repeatedly.

Using machine-learning techniques, the keypress calibrator 624 may calibrate the repeatedly and consistently inaccurate keypresses for each given key to raise the confidence that the user intended to press that given key. The local database 626 may store historical information about keypress calibration.

In this example, the mobile device 604 is depicted and described as a smartphone. Of course, other options exist for other implementations. Instead of a smartphone, the mobile device 604 may be a tablet computer, a desktop computer, a laptop computer, a phablet, a personal digital assistant (PDA), a navigational device, or any other devices that uses a soft keyboard.

Figure 7:
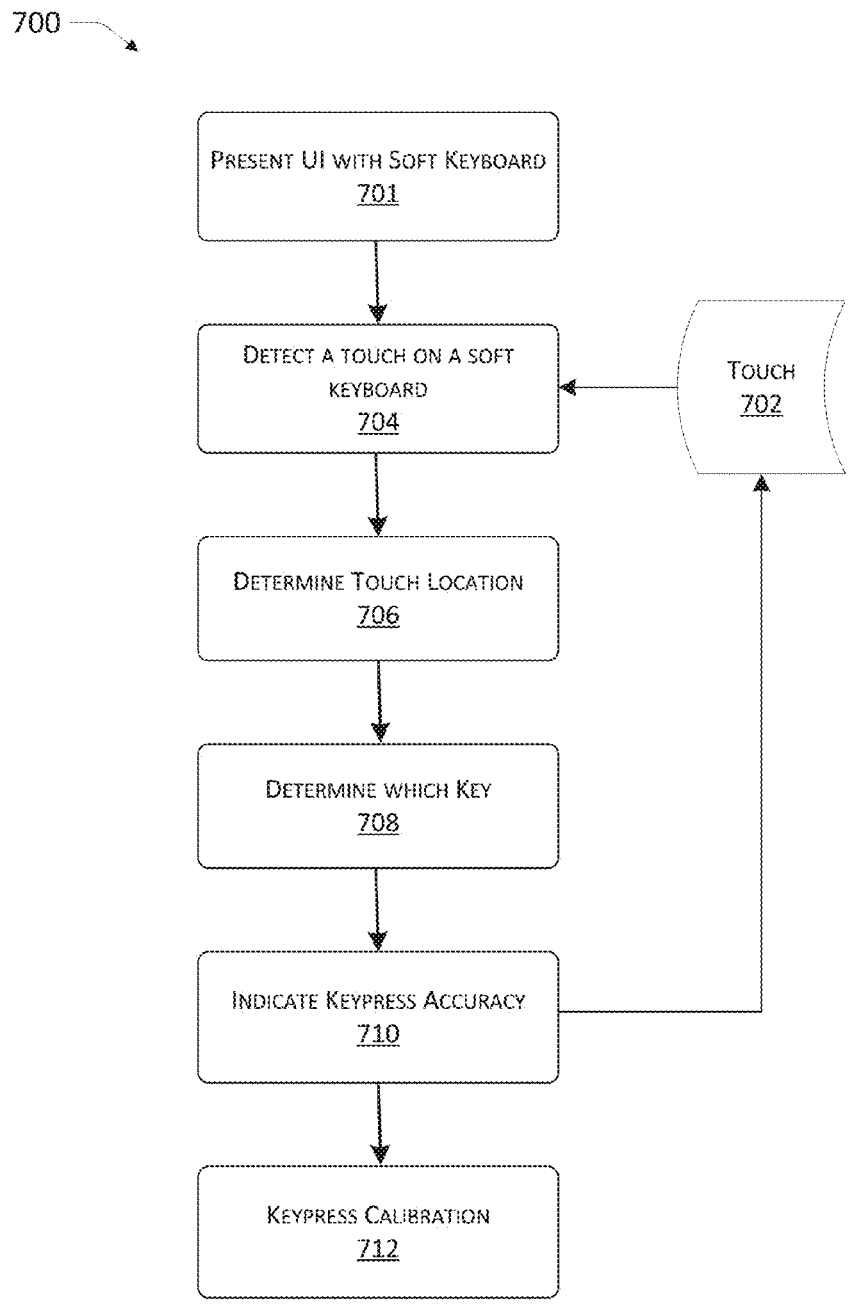
FIG. 7 illustrates an exemplary process in accordance with the technology described herein.

FIG. 7 illustrates an exemplary process 700 for implementing, at least in part, the technology described herein. In particular, process 700 depicts an operation of the example system 600. The process 700 is performed by, for example, the mobile device 604, the system 600, or some other suitable computing system.

At 701, the device presents a UI on a touchscreen of the computing device. The UI has a soft keyboard that uses all or a portion of the touchscreen.

Block 702 represents input from a user touching a soft keyboard of a touchscreen (such as touchscreen 100) of a mobile device (such as device 604).

At 704, the device detects the touch on the touchscreen (such as touchscreen 100). Alternatively, this can be described as the device detecting a sequence of touches on the soft-keyboard portion of the touchscreen.

At 706, the device determines where exactly (using, for example, Cartesian coordinates) the user's finger touched the touchscreen. More particularly, the device determines the approximate center point of the area touched by the user's finger. Alternatively, this can be described as the device determining locations on the touchscreen of each touch of the sequence.

At 708, the device determines which key is pressed based upon the corresponding portion of the screen real estate used by a given key.

At 710, the device superimposes a keypress marker (e.g., marker 310) over the soft keyboard and it centers that marker over the center point determined by the touch-location determiner 620. The device also updates the displayed marker once subsequent keys are pressed. The updates change the appearance of the displayed marker to indicate that it marks a previously pressed key and not the currently pressed key. Of course, the marker (current and previous) can be collected on and about the same key if the user presses the same key repeatedly.

Alternatively, block 710 can be described as the device presenting keypress markers on the touchscreen, wherein the keypress markers indicate the location of each touch of the sequence on the touchscreen, and the device includes adjusting appearance of the keypress markers to indicate that they represent previous touches.

The device may be designed to show only a limited or defined number of previously pressed keypress markers. For example, it might only show two or three of the previously pressed keypress markers.

At 712, using machine-learning techniques, the device calibrates the repeatedly and consistently inaccurate keypresses for each given key to raise the confidence that the user intended to press that given key.

Figure 8:
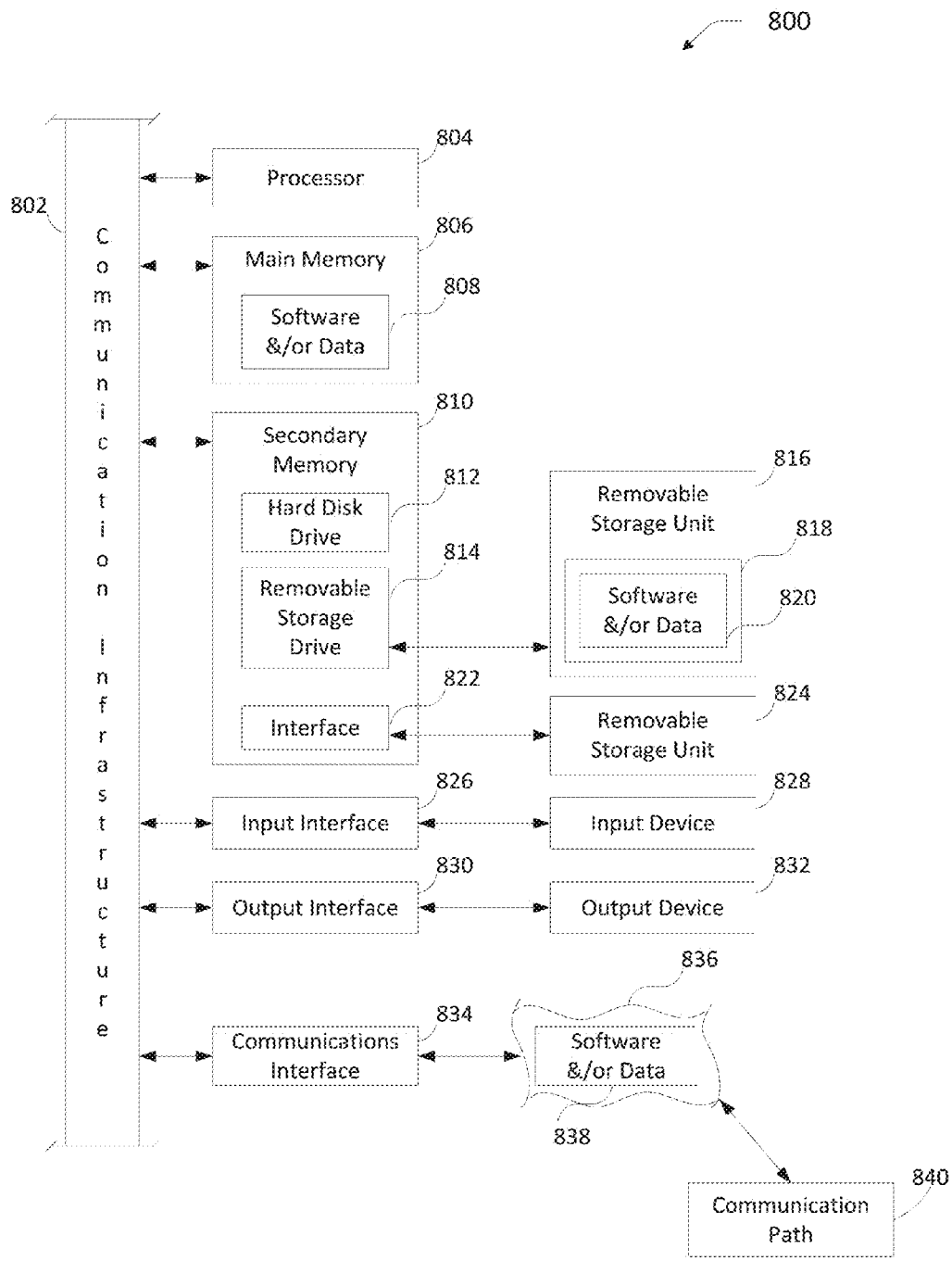
FIG. 8 illustrates an exemplary computing system to implement in accordance with the technologies described herein.

FIG. 8 illustrates an exemplary system 800 that may implement, at least in part, the technologies described herein. The computer system 800 includes one or more processors, such as processor 804. Processor 804 can be a special-purpose processor or a general-purpose processor. Processor 804 is connected to a communication infrastructure 802 (for example, a bus or a network). Depending upon the context, the computer system 800 may also be called a client device.

Computer system 800 also includes a main memory 806, preferably Random Access Memory (RAM), containing possibly inter alia computer software and/or data 808.

Computer system 800 may also include a secondary memory 810. Secondary memory 810 may include, for example, a hard disk drive 812, a removable storage drive 814, a memory stick, etc. A removable storage drive 814 may include a floppy disk drive, a magnetic tape drive, an optical disk drive, a flash memory, or the like. The removable storage drive 814 reads from and/or writes to a removable storage unit 816 in a well-known manner. A removable storage unit 816 may include a floppy disk, a magnetic tape, an optical disk, etc. which is read by and written to by removable storage drive 814. As will be appreciated by persons skilled in the relevant art(s), removable storage unit 816 includes a computer usable storage medium 818 having stored therein possibly inter alia computer software and/or data 820.

In alternative implementations, secondary memory 810 may include other similar means for allowing computer-program products or other instructions to be loaded into computer system 800. Such means may include, for example, a removable storage unit 824 and an interface 822. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 824 and interfaces 822 which allow software and data to be transferred from the removable storage unit 824 to computer system 800.

Computer system 800 may also include an input interface 826 and a range of input devices 828 such as, possibly inter alia, a keyboard, a mouse, etc.

Computer system 800 may also include an output interface 830 and a range of output devices 832 such as, possibly inter alia, a display, one or more speakers, etc.

Computer system 800 may also include a communications interface 834. Communications interface 834 allows software and/or data 838 to be transferred between computer system 800 and external devices. Communications interface 834 may include a modem, a network interface (such as an Ethernet card), a communications port, a Personal Computer Memory Card International Association (PCMCIA) slot and card, or the like. Software and/or data 838 transferred via communications interface 834 are in the form of signals 836 which may be electronic, electromagnetic, optical, or other signals capable of being received by communications interface 834. These signals 836 are provided to communications interface 834 via a communications path 840. Communications path 840 carries signals and may be implemented using a wire or cable, fiber optics, a phone line, a cellular phone link, a Radio Frequency (RF) link or other communication channels.

As used in this document, the terms "computer-program medium," "computer-usable medium," and "computer-readable medium" generally refer to media such as removable storage unit 816, removable storage unit 824, and a hard disk installed in hard disk drive 812. Computer-program medium and computer-usable medium can also refer to memories, such as main memory 806 and secondary memory 810, which can be memory semiconductors (e.g. Dynamic Random Access Memory (DRAM) elements, etc.). These computer program products are means for providing software to computer system 800.

Computer programs (also called computer control logic) are stored in main memory 806 and/or secondary memory 810. Such computer programs, when executed, enable computer system 800 to implement the present technology described herein. In particular, the computer programs, when executed, enable processor 804 to implement the processes of aspects of the above. Accordingly, such computer programs represent controllers of the computer system 800. Where the technology described herein is implemented, at least in part, using software, the software may be stored in a computer program product and loaded into computer system 800 using removable storage drive 814, interface 822, hard disk drive 812 or communications interface 834.

The technology described herein may be implemented as computer program products comprising software stored on any computer-useable medium. Such software, when executed in one or more data processing devices, causes data processing device(s) to operate as described herein. Embodiments of the technology described herein may employ any computer useable or readable medium, known now or in the future. Examples of computer-useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), and nanotechnological storage device, etc.).

A computing system may take the form of any combination of one or more of inter alia a wired device, a wireless device, a mobile phone, a feature phone, a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), a cable system or other set-top-box, an entertainment system component such as a television set, etc.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventor intends the described exemplary implementations to be primarily examples. The inventor does not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-executable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

One or more embodiments described herein may be implemented fully or partially in software and/or firmware. This software and/or firmware may take the form of processor-executable instructions contained in or on a non-transitory computer-readable storage medium. Those processor-executable instructions may then be read and executed by one or more processors to enable performance of the operations described herein. The processor-executable instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc. Processor-executable instructions may also be called computer-executable instructions herein. A computer-program product, as used herein, include one or more computer-readable media of program-executable instructions.

What is claimed is:

1. A method that facilitates keypress accuracy on a soft-keyboard of a user interface (UI), the method comprising:
   presenting a UI on a touchscreen of a computing device, the UI including a soft-keyboard that uses all or a portion of the touchscreen;
   detecting a touch on the soft-keyboard portion of the touchscreen;
   determining a location of the touch on the touchscreen; and
   presenting a just-pressed keypress marker on the touchscreen, wherein the just-pressed keypress marker is a symbol centered about and placed at the location of the touch on the touchscreen.

2. The method according to claim 1 further comprising specifying a key that corresponds to the touch location.

3. The method according to claim 1, wherein the just-pressed keypress marker is superimposed over the soft-keyboard.

4. The method according to claim 1 further comprising calculating a center point of an area of the touch on the touchscreen.

5. The method according to claim 1 further comprising centering the just-pressed keypress marker about a center point of an area of the touch on the touchscreen.

6. The method according to claim 1 further comprising:
   detecting a subsequent touch on the soft-keyboard portion of the touchscreen;
   determining a location of the subsequent touch on the touchscreen;
   presenting the just-pressed keypress marker on the touchscreen so that the just-pressed keypress marker indicates the location of the subsequent touch on the touchscreen; and
   presenting a previously pressed keypress marker on the touchscreen, wherein the previously pressed keypress marker indicates the location of the touch on the touchscreen and the previously pressed keypress marker is symbol that is differently shaped, shaded, sized or colored than the just-pressed keypress marker.

7. The method according to claim 1 further comprising:
   detecting subsequent touches on the soft-keyboard portion of the touchscreen;
   determining locations of the subsequent touches on the touchscreen; and
   presenting keypress markers on the touchscreen, wherein the keypress markers indicate the locations of the subsequent touches on the touchscreen.

8. A computer-program product that facilitates keypress accuracy on a soft-keyboard of a user interface (UI), the computer-program product comprising:
   one or more computer-readable media storing processor-executable instructions that when executed cause one or more processors to perform operations that facilitates keypress accuracy on a soft-keyboard of a user interface (UI), the operations comprising:
   presenting a UI on a touchscreen of a computing device, the UI including a soft-keyboard that uses all or a portion of the touchscreen;
   detecting a sequence of touches on the soft-keyboard portion of the touchscreen;
   determining locations on the touchscreen of each touch of the sequence; and
   presenting keypress markers on the touchscreen, wherein the keypress markers are symbols centered about and placed at the locations of the each touch of the sequence on the touchscreen.

9. The computer-program product according to claim 8, wherein the operations further comprise specifying keys that correspond to each touch location of the locations on the touchscreen of the each touch of the sequence.

10. The computer-program product according to claim 8, wherein each keypress marker is superimposed over the soft-keyboard.

11. The computer-program product according to claim 8, wherein the operations further comprise calculating a center point of each touch location of the locations on the touchscreen of the each touch of the sequence.

12. The computer-program product according to claim 8, wherein the operations further comprise centering each keypress marker about a center point of an area of its corresponding touch on the touchscreen.

13. The computer-program product according to claim 8, wherein the operations further comprise adjusting, in response to detecting a new touch, sizes, colors, shades or shapes of the keypress markers to indicate that the markers represent previous touches.

14. An apparatus that facilitates keypress accuracy on a soft-keyboard of a user interface (UI), the apparatus comprising:
   a UI manager configured to present a UI on a touchscreen of a computing device, the UI including a soft-keyboard that uses all or a portion of the touchscreen;
   a touch sensor configured to detect a sequence of touches on the soft-keyboard portion of the touchscreen;
   a touch-location determiner configured to determine locations on the touchscreen of each touch of the sequence; and
   a keypress-accuracy indicator configured to present keypress markers on the touchscreen, wherein the keypress markers are symbols centered about and placed at the locations of the each touch of the sequence on the touchscreen.

15. The apparatus according to claim 14, wherein the UI manager is further configured to specify keys that correspond to each touch location of the locations on the touchscreen of the each touch of the sequence.

16. The apparatus according to claim 14, wherein the keypress-accuracy indicator is further configured to superimpose each keypress marker over the soft-keyboard.

17. The apparatus according to claim 14, wherein the keypress-accuracy indicator is further configured to calculate a center point of each touch location of the locations on the touchscreen of the each touch of the sequence.

18. The apparatus according to claim 14, wherein the keypress-accuracy indicator is further configured to center each keypress marker about a center point of an area of its corresponding touch on the touchscreen.

19. The apparatus according to claim 14, wherein the keypress-accuracy indicator is further configured to adjust, in response to detecting a new touch, sizes, colors, shades or shapes of the keypress markers to indicate that they represent previous touches.

20. The apparatus according to claim 14, wherein the keypress-accuracy indicator is further configured to present a defined number of keypress markers.

\* \* \* \* \*